Figures 1, 6:
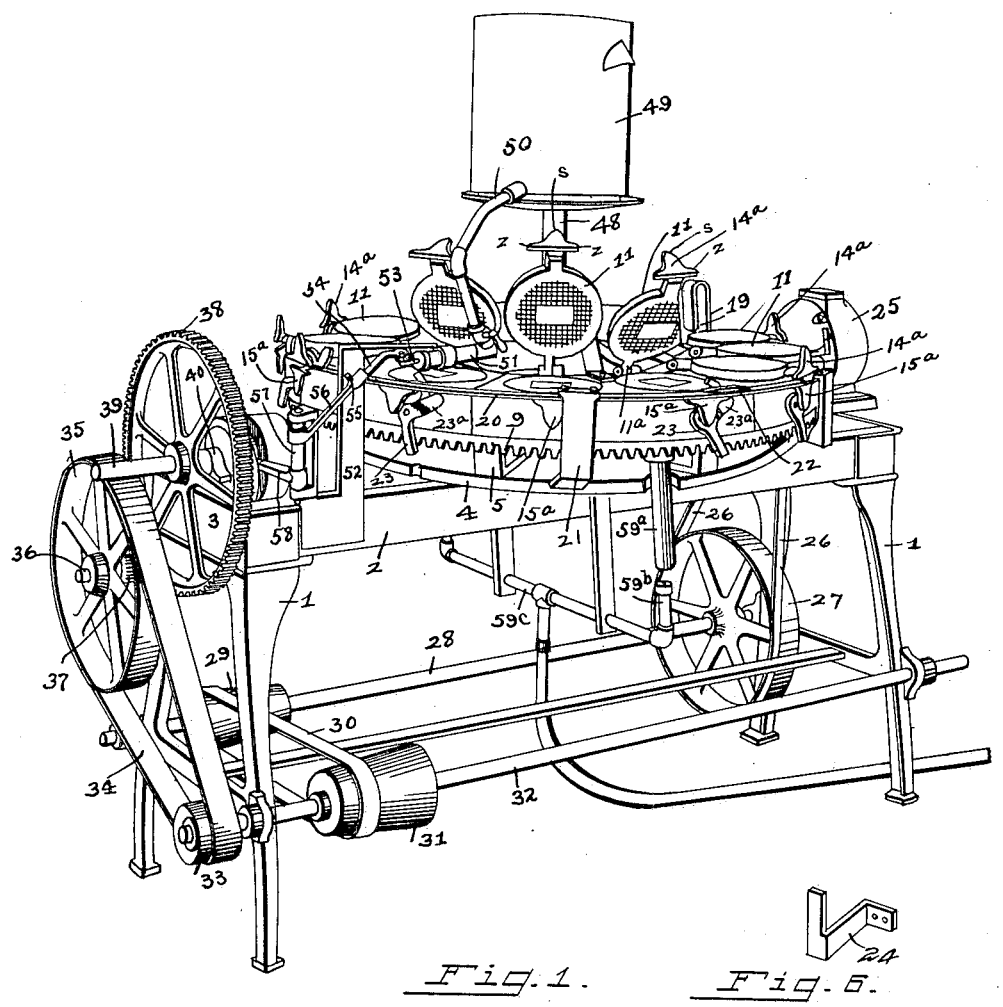

W. W. TURNBULL & C. R. TAYLOR.
BATTER BAKING MACHINE.
APPLICATION FILED OCT. 6, 1909.

1,117,929.

Patented Nov. 17, 1914.
3 SHEETS—SHEET 1.

Witnesses
L. Carl Stoughton
A. L. Phelps

Inventors
Werd W. Turnbull
Carl R. Taylor

By C. C. Shepherd
Attorney

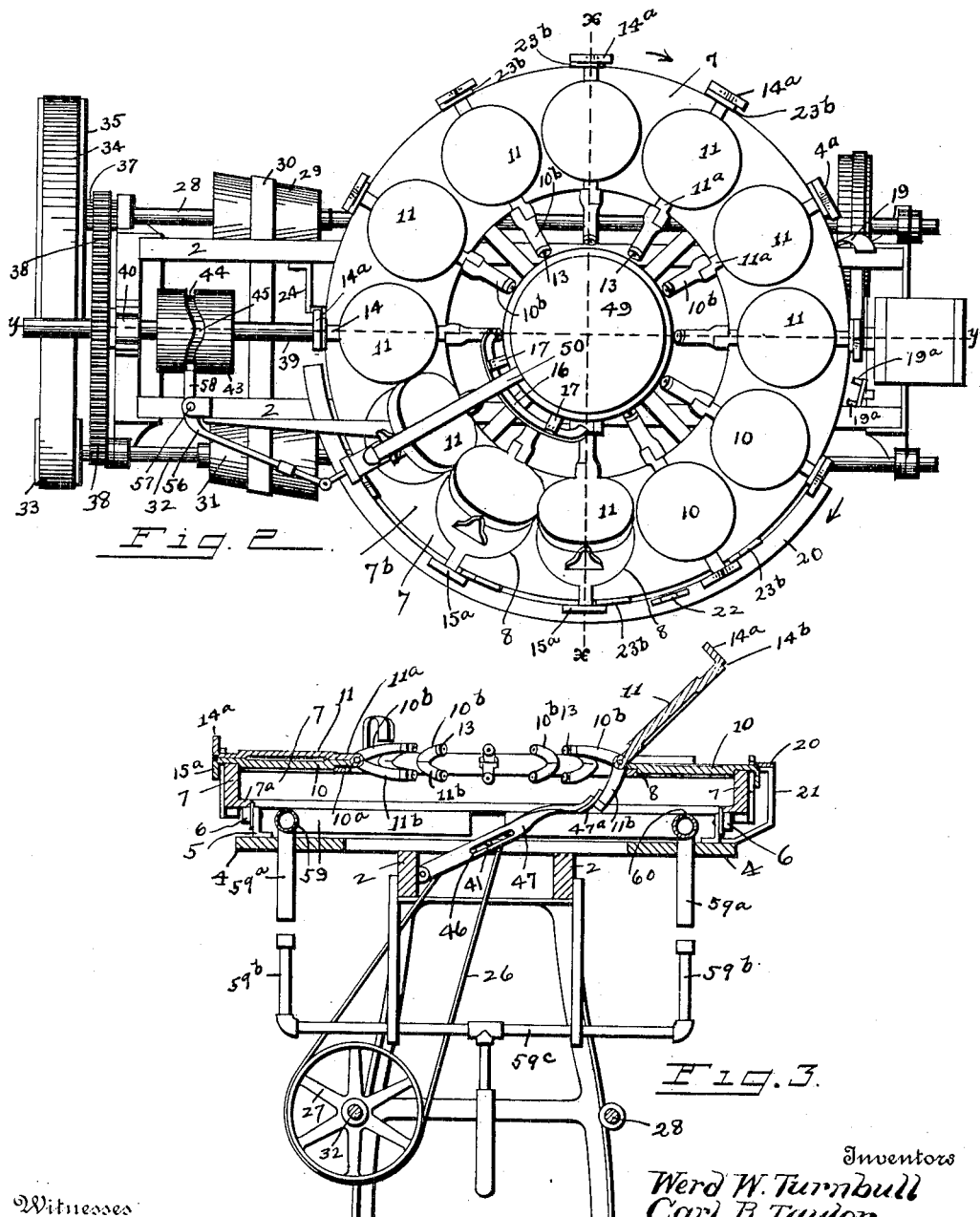

W. W. TURNBULL & C. R. TAYLOR.
BATTER BAKING MACHINE.
APPLICATION FILED OCT. 6, 1909.
1,117,929.
Patented Nov. 17, 1914.
3 SHEETS—SHEET 3.
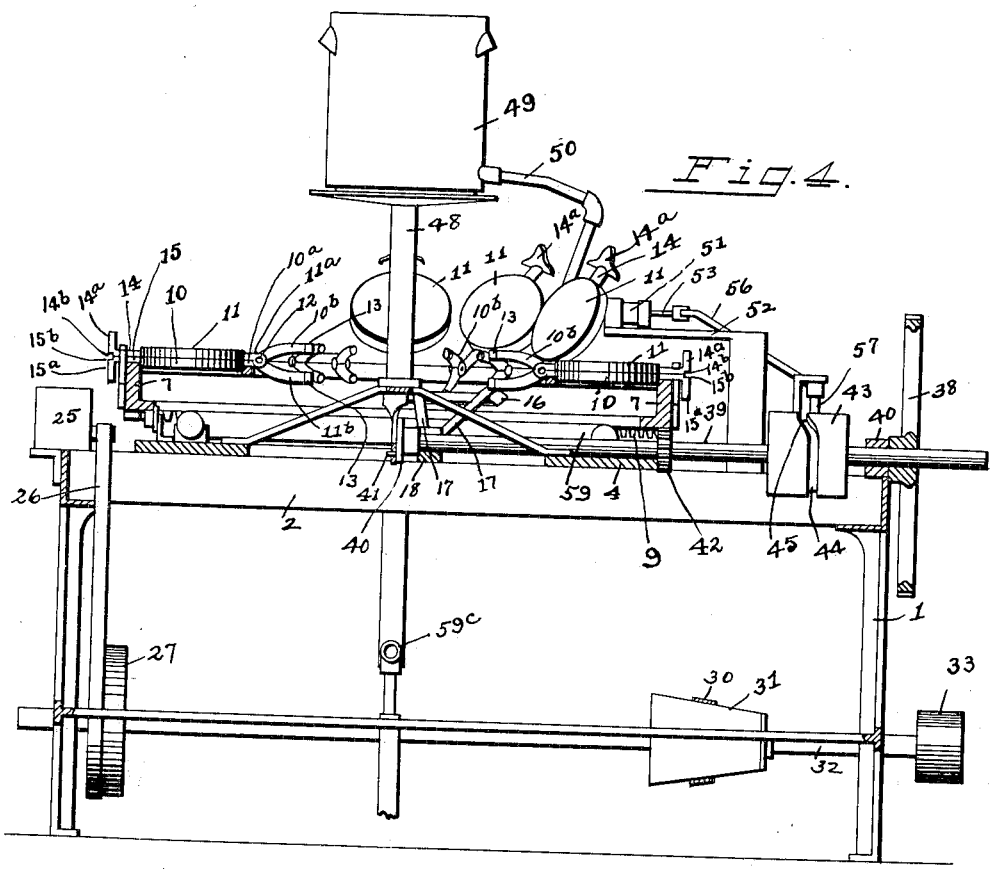
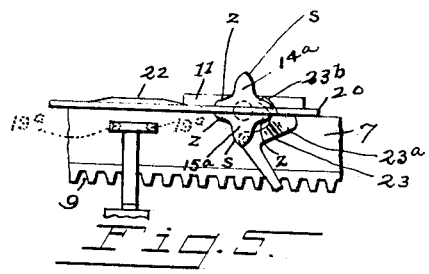
Witnesses
L. Carl Stoughton
A. L. Phelps
Inventors
Werd W. Turnbull
Carl R. Taylor
By C. C. Shepherd
Attorney

UNITED STATES PATENT OFFICE.

WERD W. TURNBULL AND CARL R. TAYLOR, OF COLUMBUS, OHIO; SAID TURNBULL ASSIGNOR TO THE TURNBULL MANUFACTURING COMPANY, OF COLUMBUS, OHIO, A CORPORATION OF OHIO.

BATTER-BAKING MACHINE.

1,117,929. Specification of Letters Patent. Patented Nov. 17, 1914.

Application filed October 6, 1909. Serial No. 521,341.

*To all whom it may concern:*

Be it known that we, WERD W. TURNBULL and CARL R. TAYLOR, citizens of the United States, residing at Columbus, in the county of Franklin and State of Ohio, have invented certain new and useful Improvements in Batter-Baking Machines, of which the following is a specification.

Our invention relates to the improvement of batter baking machines of that class which are adapted for the baking of a suitable batter mixture, which is adapted when baked, to be converted into conical receptacles for ice cream, known as ice cream cones.

Our invention resides mainly in a control mechanism or mechanisms for imparting and maintaining a relative separation of the sections forming the baking units. We have found that, especially in the manufacture of ice cream cone wafers, there are a number of features to be taken into consideration. First, the thickness of the finished wafer depends largely upon the consistency of the batter and the weight of the baking irons used. With each increase in the weight of these irons, the amount of power and the direct application of force is increased when it is desired to elevate the plates to cause a relative separation of the sections forming each unit. In addition to this, the nature of the batter required in the manufacture of these wafers, is such that they will cling to the baking irons to a very marked extent and will thereby again increase the force required in the relative separation of the baking units.

It is essential that the wafers, in their process of baking, be subjected to a uniform heat and that this heat be applied during as much of the cycle of operation as is possible in order to reduce the size of the machine. However, space must be provided for permitting the removal of the finished product and the discharging of the batter. Not only must this space be such to accommodate these two features, but it must also be of a nature where the wafers are hand rolled, to permit the operator sufficient space to remove and roll these wafers. All these features considered, we have found it essential to provide means for initially causing a separation of the sections forming the baking units and independent means subsequently effective for maintaining such separation. In view of the weight of the plates and the sticking properties of the wafers, this initial separation should be applied at a point of greatest vantage, and where the two sections forming a baking unit are hingedly connected, this point is at the fore part of the baking units or at the point of greatest leverage. After the initial separation, the independent mechanism for maintaining the separation may be applied at a greatly reduced leverage and at a point not to interfere with either the removal of the baked product by the operator, or the discharge of batter. The initial separation of the sections of the baking units may be only sufficient to break the irons from the wafer and second, means may be provided for continuing this separation. This we also claim as novel and as being another important feature of our invention.

In applying a uniform heat to the baking units, we have found it desirable to rotatably mount each baking unit so that the same may be rotated to present for use the lowermost plate to top position at the end of each complete cycle of operation. This rotation may be only 180 degrees or it may be commensurate with 180 degrees as may be desired, it being essential only that the top and bottom sections of the unit be alternated for each succeeding cycle of operation.

In a machine of the type referred to in the above paragraph, we have found it to great advantage to form each baking unit of plates which are interchangeable, whereby the mechanism for operating one of the plates will also operate the other.

The preferred embodiment of our invention is shown in the accompanying drawings, in which similar characters of reference designate corresponding parts, and in which:

Figure 1 is a perspective view of our improved baking apparatus with parts broken away, Fig. 2 is a plan view of the same, Fig. 3 is a sectional view on line *x—x* of Fig. 2, Fig. 4 is a sectional view on line *y—y* of Fig. 2, Fig. 5 is a side elevation of a section of the plate carrying ring illustrating the means for locking two plate or iron sections together, and, Fig. 6 is a detail perspective of a contact bracket hereinafter described.

Similar numerals refer to similar parts throughout the several views.

In carrying out our invention, we employ a table-like framework of an oblong form, which comprises upright supporting leg members 1, side frame bars 2 and end frame bars 3. Upon the frame bars 2 is supported horizontally a disk or base plate 4, from the marginal portion of which at intervals, rise fixed brackets 5 in the upper end portion of each of which is pivoted a flanged roller 6. Upon these rollers 6, bears the inturned bottom flange $7^a$ of a baking iron or unit carrying ring member 7, the latter being of substantially channel form in cross section and having its upper and wider inwardly extending flange $7^b$, formed with a plurality of vertical openings 8 therethrough. For the sake of convenience in construction, the ring 7 may be formed in sections or curved segments suitably united one with the other, or said ring may be one piece if desired. The underside of the ring 7 at its marginal portion, is provided with a toothed ring or circular rack 9. In each of the openings 8 is adapted to fit loosely, the lower disk-like member 10 of a baking unit or iron, the latter being formed with a circular depression on its upper face. Upon each of these lower plates 8 is adapted to bear an upper similarly formed disk-like plate or member 11, each of these members 10 and 11 having projecting from its rear side a hinge arm, said hinge arms being indicated at $10^a$ and $11^a$ and pivoted or hinged one to the other as indicated at 12. The hinge arm $10^a$ is formed with an elevated extension $10^b$, while the arm 11 is formed with a similar depressed extension $11^b$. Each of these extensions or fingers, carries at its end a pivoted roller 13.

The outer or forward side of each of the disk-like plates 11, is provided with a forwardly extending arm or stem 14 which terminates in an upturned ear or lug $14^a$. The lower plate member 10 is likewise provided with a forwardly extending stem 15, which terminates in a downwardly extending ear or lug $15^a$ and each stem bears in a half-round groove in the upper side of the ring 7. As indicated more clearly in Fig. 4 of the drawing, the base of the lug or ear $14^a$ is formed with an outer side angularly recess $14^b$, while a similar recess $15^b$ is formed in the outer side and upper portion of the stem lug $15^a$. It will thus be seen that the plates are identical in construction and are, therefore, interchangeable.

Supported in the circular path of the ends of the arms $10^b$ and $11^b$ and their rollers is a cam trackway 16, the latter having its end slightly upturned and being held in fixed position by suitable supporting bars 17 which are secured to a cross frame member 18 which extends between the side frame bars 2. Rising from one of the frame standards 2 adjoining the ring 7 and adjacent to the periphery of the latter, is an upright contact member 19. This upright contact member is so located as to insure a successive contact with the projecting portions $23^a$ of the catch members 23, for the purpose hereinafter set forth. I also provide adjacent to the periphery of the ring frame 7, two laterally projecting separated pins $19^a$, these pins being suitably supported from the framework of the machine as shown in Fig. 5.

20 represents a ring segment or curved bar, which is supported adjacent to the side of the ring 7 by brackets 21 which rise from the base plate 4. The inner edge portion of the bar or ring segment 20 is adapted, as shown, to extend within or be received by the recessed portions $14^b$ and $15^b$ of the baking plate stem lugs $14^a$ and $15^a$ when said lugs are moved to positions opposite said ring segment. In order that the baking plates may be given an initial separation after the wafer has been baked and in order that this separating force be applied at a point of greatest leverage, we have provided means acting upon the forward portions of the stems of these baking plates. Therefore, upon the ring segment at a desirable point, is provided a raised cam projection 22 which tapers toward its ends and over which the bases of the upper lugs $14^a$ are adapted to travel when the ring 7 is revolved. Pivoted to the outer surface of the ring 7 beneath each of the lower lugs $15^a$ is an angular lever or locking trigger 23, the upper arm $23^a$ of which has formed therewith a curved finger $23^b$ which when the lower arm of said lever is swung upward, is adapted to embrace the upper side of the stem extension of the baking irons, which comprises the members 14 and 15. Supported from the frame of the machine adjacent to the outer side of the ring 7 as shown in Fig. 2 is a suitable bracket or contact member 24 which projects in the path of the lower arm of the levers 23.

Upon the framework at one side of the main ring 7 is located a suitable form of power generating motor 25 and from a wheel on the shaft of said motor, a belt 26 runs over a belt wheel 27 which is carried on a horizontal shaft 28, said shaft being journaled in the lower portion of the upright framework of the machine. The shaft 28 carries a belt carrying cone 29 which through the medium of a belt 30 is connected with a second and similar cone 31 carried on a shaft 32, which is parallel with the shaft 28 and which is also journaled in the frame members 1. This shaft 32 carries on one of its outer ends a small belt wheel 33. Over this last named wheel runs a belt 34 which also runs over a belt wheel 35 carried on the end of a short shaft 36 which is journaled in the upper part of one of the frame members 1. The shaft 36 carries on the inner side of the wheel 35 a pinion 37 which gears with the lower portion of a comparatively large gear wheel 38 which is carried on a shaft 39, the latter being mounted in suitable bearings 40 supported upon the upper side of one of the end frame members 3. The shaft 39 extends inward beneath the ring 7 and has its inner end portion supported in a suitable bearing carried on the cross frame member 18. This inner end of the shaft 39 carries a disk 40 from which projects eccentrically a pin 41. The shaft 39 also carries a pinion wheel 42 which gears with the circular rack 9 which is carried by the ring 7.

43 represents a circular cam body which is also carried on the shaft 39 and at a point adjacent to its bearing 40, this cam body is provided with a continuous peripheral groove 44 which is formed with an offset 45. The projecting pin 41 of the disk 40 extends loosely through a slotted opening 46 in an inclined bar or lever 47, the lower end of which is pivotally connected with one of the frame members 2 and the upper end portion of which is provided with a curved terminal contact plate 47ᵃ.

Through the medium of a suitable standard 48, we support above the center of the ring 7 at a suitable height a batter reservoir or supply tank 49 and from the lower portion of this tank leads outward and downward a pipe 50, the latter connecting with a horizontally disposed pump cylinder 51 near one end thereof. This pump cylinder is supported by a suitable frame arm or bracket 52 above the ring 7 in position for the discharge of batter through an opening in the underside of the cylinder on to the lower members of the baking plates or irons when the upper members thereof are raised and when the ring 7 is rotated. The pump cylinder is provided with a desirable form of piston rod 53 which enters the cylinder, said piston rod having its upturned outer end pivotally connected with a short downwardly inclined arm 54 which in turn is through the medium of a set screw 55 adjustably connected with an arm 56, the lower end of which is connected with a vertically mounted pivot pin 57 having a laterally extending arm 58 which projects within the cam recess 44 of the cam body 43.

Beneath the ring 7 at a suitable distance below the same, we provide a gas burner comprising semi-circular sections 59, the latter having suitable upper side perforations 60. These burner sections have connected therewith the upper ends of vertical gas pipes 59ᵃ which are fed from the arms 59ᵇ of a gas supply pipe 59ᶜ. Through the gear and belt connections heretofore described, a desirable rotary motion is imparted to the ring 7 from the motor shaft.

For the sake of clearness in describing the operation of our machine, we will assume that a majority of the successively arranged baking irons or units are in their closed positions; that the batter to be baked is contained between the sections of these baking irons and that the angular locking members 23 which belong to these closed plates, have their fingers 23ᵇ thrown over the stem bodies 14 of the plate sections 11, thereby locking said plate sections in desirable closed engagement one with the other. As each of these closed and locked baking members is brought opposite the contact member 19 the downwardly extending arm of the catch member 23 is engaged by said contact member 19, with the result that the catch member is so swung on its pivot as to cause its curved finger 23ᵇ to be disengaged from the stem section of the upper baking iron, thereby releasing or unlocking said stem sections. It will be noted that each of the lugs 14ᵃ and 15ᵃ of the plate stems is so formed as to comprise two opposing base projections or half tooth members such as are indicated in Fig. 5 at $z$ and an intermediate projecting tooth member $s$, with the result that when the upper and lower plate lugs have their stem portions joined, said lugs form a toothed body having somewhat the construction of a star wheel. After a catch member 23 has been released in the manner above described, the continued rotation of the ring 7 results in two of the teeth $s$ and $z$ of the lugs 14ᵃ and 15ᵃ engaging the separated pins 19ᵃ, with the result that a rotation of the baking iron is affected and a consequent inversion of said iron produced. In this manner the baking irons are successively turned or inverted so as to insure the heating of the same on both sides and a consequent proper uniform baking of the batter contained between the irons. A further continued rotation of the ring 7 results in the curved plate 20 being loosely embraced within the recess formed by the offsets 14ᵇ and 15ᵇ in the bases of the lugs 14ᵃ and 15ᵃ and as each of the upper lugs comes into contact with and rides over the cam projection 22 of said curved plate, a sufficient elevation of the upper baking plate member is attained to insure a breaking loose or separation of the baked product from the upper plate. This operation becomes necessary on account of the tendency of the baked product to stick to the heated irons and thereby prevent the sections of the baking iron from being readily elevated one above the other. This being accomplished, the downwardly bent arms 10ᵇ or 11ᵇ as the case may be, of the upper plate section, is engaged by the curved plate termination 47ª of the lever 47, said lever owing to the projection of the eccentric pin 41 through its slot 46 having a swinging motion. In this downward swinging motion, the lever 47 presses the plate arm which is engaged therewith, downward, thereby elevating the upper plate section to the position indicated at the right in Fig. 3 of the drawing. As the lever 47 again swings upward, the depressed plate arm is engaged by the cam trackway 16 against the outer and underside of which said arm bears until it has passed the opposite end of the same. In this manner the elevated plate section is retained in its elevated position a sufficient length of time to permit of the removal of the baked product from between the plate sections and to permit of the discharge of a desirable quantity of batter upon the lower plate section. As will readily be understood, this operation of discharging batter at proper intervals from the pump cylinder on to the lower plate section, is accomplished through the engagement of the arm 58 with the peripheral recess 44 of the cam body 43, it being obvious that at each revolution of the cam body the arm 58 is brought into the offset 45 of said cam recess 44, with the result that the piston rod of the pump cylinder, is moved outward and as said arm 58 leaves said recess offset, said piston rod is moved inward. In this manner a charge of batter is drawn into the pump cylinder and discharged therefrom as each lower plate section moves beneath the pump cylinder. When the depressed arm extension of the upper plate section, rides out of contact with the trackway 16, it is obvious that said upper section will descend and that when the lower arm of the locking member 23 contacts with the frame projection 24, the locking finger 23ᵇ will again be swung over the upper side of the projecting stem of the upper plate section, thereby locking the plate sections in desirable engagement one with the other. The locking of the baking plate sections together in the manner described is somewhat essential because of the fact that the baking units are inverted during the complete rotation of the ring members 7.

By the operation described, it will be understood that the plate sections of the baking irons are successively locked in engagement one with the other and after a predetermined time released, this release being followed by the turning over of the irons, the initial separation of the same, the raising of the upper iron section, the discharge of batter and the relocking of the sections. It will thus be seen that a baking machine is provided by means of which baked products designed for the making of ice-cream cones or for other purposes, are rapidly and uniformly produced.

From the foregoing description, it will be seen that simple and efficient means are herein provided for accomplishing the object of the invention, but while the elements shown and described are well adapted to serve the purposes for which they are intended, it is to be understood that the invention is not limited to the precise construction set forth, but includes within its purview such changes as may be made within the scope of the appended claims.

What we claim, is:

1. A baking machine comprising a rotatable element, hinged plates carried thereby, means for maintaining said plates in elevated position during a determinate period of the rotation, and independent means for initially elevating said plates.

2. A baking machine comprising a rotatable element, hinged plates carried thereby, means for maintaining said plates in elevated position during a determinate period of the rotation, and independent means for initially elevating said plates in successive steps.

3. A baking machine comprising a rotatable element, hinged plates carried thereby, means for maintaining said plates in elevated position during a determinate period of the rotation, and independent means for initially elevating said plates in successive steps, said means comprising relatively independent units.

4. A baking machine comprising a rotatable element, hinged plates carried thereby, means for maintaining said plates in elevated relation during a determinate period of the rotation and a lever for automatically moving said plates into subjection to said means.

5. A baking machine comprising a rotatable element, hinged plates carried thereby, means for maintaining said plates in elevated position during a determinate period of the rotation, a lever for automatically moving said plates into subjection to said means, and a means for slightly raising said plates just preceding movement by said levers.

6. A baking machine comprising sectional traveling baking units, means for maintaining the sections of said traveling units separated for a determinate interval in the period of travel, and independent mechanism for initially separating said sections.

7. A baking machine comprising sectional traveling baking units, means for maintaining the sections of said units separated for a determinate interval in the period of travel and independent mechanism for separating said sections in successive steps prior to the operation of said means.

8. In a machine of the character described, the combination with a supporting frame, and a baking ring rotatably mounted on said frame and having a rack on its lower side, of a plurality of baking plates hinged in connection with said baking ring, a fixed channel member within the circle of said baking ring and having an upwardly inclined termination, a shaft journaled beneath said baking ring, a disk on said shaft, a pivoted lever eccentrically fulcrumed on said disk adapted to successively engage and elevate said hinged baking plates, a pinion wheel carried by said shaft and engaging said rack, and means for operating said shaft.

9. A baking machine comprising a pair of traveling separable baking elements between which the batter is baked, and means for separating said elements, said means comprising relatively independent mechanisms adapted to operate upon said elements in varying amounts of separating force, the mechanism operating with the greater force arranged to be applied at the beginning of such separation.

10. A baking machine comprising sectional traveling baking units, means engaging said units to maintain the sections thereof separated for a determinate interval in the period of travel, and independent means adapted and arranged to act through a greater leverage than said first means for imparting an initial separation to the sections of said units.

11. A baking machine comprising a pair of traveling separable baking elements between which the batter is baked, means adapted and arranged to separate said elements during their period of travel, and independent means for maintaining said sections separated for a determinate interval, said first means being adapted and arranged to subject one of the relatively separated elements to said last means during the period of travel of said element, said separating means and said maintaining means being arranged to act upon different portions of said baking elements.

12. A baking machine comprising sectional traveling baking units hingedly connected at their rear portions, means engaging the fore part of said units arranged to cause a relative separation of the sections thereof, and independent means engaging the rear of said units arranged to maintain a separation for a determinate interval.

13. A baking machine comprising a pair of traveling separable hingedly connected baking elements between which the batter is baked, and means adapted and arranged to separate said elements, said means comprising relatively independent mechanisms having different points of application on one of said elements.

14. A baking machine comprising a pair of traveling separable baking elements between which the batter is baked, and two independent mechanisms adapted and arranged to separate said elements and acting at different times, the mechanism which acts initially acting more slowly than the other mechanism.

15. A baking machine comprising a pair of traveling separable baking elements between which the batter is baked, and independent mechanisms acting successively and adapted and arranged to separate said elements and to maintain them separated, the mechanism which acts initially having a greater leverage than the other mechanism.

16. A baking machine comprising a pair of traveling separable baking elements between which the batter is baked, and two independent mechanisms arranged to separate said elements adapted and arranged to act at different times, the mechanism which acts initially having a greater leverage than the other mechanism.

17. A baking machine comprising a pair of traveling separable baking elements between which the batter is baked, and two independent mechanisms arranged to separate said elements and arranged to act at different times, the mechanism which acts initially having a greater leverage and acting more slowly than the other mechanism.

18. A baking machine comprising a plurality of sectional traveling baking units between the sections of which the batter is baked, the upper section of each unit being hingedly mounted at its rear, means engaging the fore part of each unit for imparting a separation to the sections thereof, and means independent of said first named means engaging said units to the rear of the point of application of said first means to maintain the sections of said units separated for a determinate interval.

19. A baking machine comprising a plurality of sectional traveling baking units between the sections of which the batter is baked, the upper section of each unit being hingedly mounted at its rear, an arm extending rearwardly of the hinge connection of each unit, means engaging the fore part of said units for imparting separation to the sections thereof, and independent means engaging said arms to maintain said sections separated for a determinate interval.

20. A baking machine comprising a plurality of sectional traveling baking units between the sections of which the batter is baked, the upper section of each unit being hingedly mounted at its rear, an arm extending rearwardly of the hinge connection of each unit, means engaging the fore part of said units for imparting a separation to the sections thereof, and independent mechanism engaging said arms to complete the separation of said sections and to maintain them separated for a determinate interval.

21. A baking machine comprising a plurality of sectional traveling baking units between the sections of which the batter is baked, the upper section of each unit being hingedly mounted at its rear, means engaging the fore part of each unit for imparting a relative separation to the sections thereof, and independent mechanism acting with less leverage than that of the first named means for maintaining the sections of said units separated for a determinate interval.

22. A baking machine comprising a plurality of sectional traveling baking units between the sections of which the batter is baked, the upper section of each unit being hingedly mounted at its rear, means engaging the fore part of each unit for imparting a relative separation to the sections thereof, and independent mechanism acting with less leverage than that of the first named means for completing the separation and maintaining the sections of said units separated for a determinate interval.

23. A baking machine comprising a plurality of sectional traveling baking units between the sections of which the batter is baked, the upper section of each unit being hingedly mounted at its rear, means engaging the fore part of each unit for imparting an initial separation to the sections thereof, independent means acting with less leverage than that of the first named means for completing said separation, and a third independent means for maintaining the sections separated for a determinate interval.

24. A baking machine comprising a plurality of sectional traveling baking units, the upper section of each unit being hingedly mounted at its rear, a cam disposed in the path of travel of the fore part of said units to cause a separation of the sections thereof, an arm projecting rearwardly of the hinge connection of said upper sections, and a trackway engaging said arms to maintain a separation during a determinate interval.

25. A baking machine comprising a plurality of sectional traveling baking units, the upper section of each unit being hingedly mounted at its rear, a cam disposed in the path of travel of the fore part of said units to cause an initial separation thereof, an arm projecting rearwardly of the hinge connection of said upper sections, means arranged to continue the separation of the sections of said units and a cam trackway engaging said arms to maintain the sections of said units and to maintain them separated for a determinate interval.

26. A baking machine comprising a plurality of sectional traveling baking units, the upper section of each unit being hingedly mounted at its rear, a cam disposed in the path of travel of the fore part of said units to cause an initial separation of the sections thereof, an arm projecting rearwardly of the hinge connection of said upper sections, and an element movable up and down to engage said arm to thereby raise the plate.

27. A baking machine comprising a plurality of sectional traveling baking units, the upper section of each unit being hingedly mounted at its rear, a cam disposed in the path of travel of the fore part of said units to cause an initial separtion of the sections thereof, an arm projecting rearwardly of the hinge connection of said upper sections, and a pivoted lever element adapted to engage said arms and arranged to continue the elevation of said upper sections.

28. A baking machine comprising a plurality of sectional traveling baking units, the upper section of each unit being hingedly mounted at its rear, a cam disposed in the path of travel of the fore part of said units to cause an initial separation of the sections thereof, an arm projecting rearwardly of the hinge connection of said upper sections, a pivoted lever element adapted to engage said arms and arranged to continue the separation of said sections, and a trackway adapted to engage said arms after the operation of said lever to maintain the sections separated for a determinate interval.

29. A baking machine comprising a plurality of sectional traveling baking units, the upper section of each unit being hingedly mounted at its rear, an arm projecting rearwardly of the hinge connection of said upper sections, a pivoted lever element movable up and down to engage said arms to cause a separation of the sections of said units, and a trackway adapted to engage said arms after the operation of said lever to maintain said sections separated for a determinate interval.

30. A baking machine comprising a plurality of sectional traveling baking units, the upper section of each unit being hingedly mounted at its rear, an arm projecting rearwardly of the hinge connection of said upper sections, a pivoted lever element movable up and down to engage said arms to cause a separation of the sections of said units, and a cam trackway adapted to engage said arms after the operation of said lever to continue the separation of and to maintain said sections separated for a determinate interval.

31. A baking machine comprising a traveling element, a plurality of baking units comprising superimposed baking plates of similar construction rotatably carried by said element, means for periodically rotating said units to present the lowermost plates thereof to top position at the end of each cycle of operation of said element, means for heating one of said plates during such revolution, and means for separating the plates of said units during a determinate period of the travel of said element.

32. A baking machine comprising a rotatable element, a plurality of baking units comprising complemental superimposed plates rotatably carried by said element, means for successively presenting the lowermost plates of said units to top position at the end of each complete revolution of said element, and means for successively maintaining the newly presented uppermost plates of said units in elevated position during a determinate period of each revolution of said element.

33. A baking machine comprising a rotatable element, a plurality of baking units comprising interchangeable superimposed hingedly connected plates rotatably carried by said element, means for successively presenting the plates lowermost at the beginning of each revolution of each unit to top position at the end of each revolution of said element, and means for successively maintaining the newly presented uppermost plates of said units in elevated position during a determinate period of each revolution of said element.

34. A baking machine comprising a horizontally rotatable table, a plurality of baking units comprising superimposed plates rotatably carried by said table, means for successively presenting the lowermost plates of said units to top position at the end of each complete revolution of said element, means for heating one of said plates during such revolution, means for elevating the newly presented top plates during a determinate period of the rotation of said element, and means for positively holding the complemental lower plates of said elevated plates against upward movement during such elevation.

35. A baking machine comprising a horizontally rotatable table, a plurality of baking units comprising superimposed plates rotatably carried by said table, means for successively presenting the lowermost plates of said units to top position at the end of each complete revolution of said element, means for elevating the newly presented top plates during a determinate period of the rotation of said element, means for positively holding the complemental lower plates of said elevated plates against upward movement during such elevation, and means for giving said top plates a slight initial elevation while their lower plates are locked against elevation and prior to the operation of said first mentioned elevating means.

36. A baking machine comprising a horizontally rotatable table, a plurality of baking units comprising superimposed hingedly connected plates rotatably carried by said table, means for successively presenting the lowermost plates of said units to top position at the end of each complete revolution of said element, an arm extending rearwardly of the hinge connection of each plate, and means engaging certain of said arms to cause and maintain an elevation of said plates during a determinate interval of the rotation of said table, means for heating the lowermost plate substantially throughout such revolution.

37. A baking machine comprising a horizontally rotatable table, a plurality of baking units comprising superimposed hingedly connected plates rotatably carried by said table, means for successively presenting the lowermost plates of said units to top position at the end of each complete revolution of said element, an arm extending rearwardly of the hinge connection of each plate, means engaging the fore part of the plates of said units to cause an initial separation thereof, and independent means for subsequently engaging certain of said arms to continue the elevation and maintain said plates elevated during a determinate interval of the rotation of said table.

38. A baking machine comprising a horizontally rotatable table, a plurality of baking units comprising superimposed hingedly connected plates rotatably carried by said table, a projecting stem on each of said plates, opposing lugs on each of said stems, fixed contact means adjacent the table and adapted by engagement with the lugs of certain of said plates to present for use the lowermost plates of said units to top position at the end of each revolution of said table.

In testimony whereof we affix our signatures in presence of two witnesses.

WERD W. TURNBULL.
CARL R. TAYLOR.

Witnesses:
C. C. SHEPHERD,
E. V. GRISWOLD.